(12) United States Patent
Kuffner, Jr. et al.

(10) Patent No.: US 9,486,922 B2
(45) Date of Patent: *Nov. 8, 2016

(54) SYSTEMS AND METHODS FOR DETERMINING A STATUS OF A COMPONENT OF A DEVICE

(71) Applicant: X Development LLC, Mountain View, CA (US)

(72) Inventors: James J. Kuffner, Jr., Mountain View, CA (US); Ryan Hickman, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,239

(22) Filed: Mar. 30, 2016

(65) Prior Publication Data
US 2016/0207200 A1     Jul. 21, 2016

Related U.S. Application Data

(63) Continuation of application No. 14/556,846, filed on Dec. 1, 2014, now Pat. No. 9,327,404, which is a continuation of application No. 13/757,808, filed on Feb. 3, 2013, now Pat. No. 8,930,022.

(60) Provisional application No. 61/595,865, filed on Feb. 7, 2012.

(51) Int. Cl.
*G05B 19/04*     (2006.01)
*B25J 9/16*      (2006.01)
*H04L 29/08*     (2006.01)

(52) U.S. Cl.
CPC ............. *B25J 9/1692* (2013.01); *H04L 67/12* (2013.01)

(58) Field of Classification Search
CPC ............................. B62D 55/075; B25J 5/005
USPC ........ 700/245, 254; 180/9.1, 9.4, 9.32, 65.8; 901/1
See application file for complete search history.

(56) References Cited

U.S. PATENT DOCUMENTS 7,600,593 B2    10/2009  Filippov et al.
8,307,061 B1 *  11/2012  Hickman ................. B25J 9/161
                                              318/568.12

(Continued)

OTHER PUBLICATIONS

Arumugan, Rajesh et al, DAvinCi: A Cloud Computing Framework for Service Robots, 2010 IEEE Conference on Robotics and Automation, Anchorage Convention District, Anchorage, Alaska, May 3-8, 2010.

(Continued)

*Primary Examiner* — Marc McDieunel
(74) *Attorney, Agent, or Firm* — McDonnell Boehnen Hulbert & Berghoff LLP (57) ABSTRACT

Methods and systems for determining a status of a component of a device are provided. An example method includes triggering an action of a component of a device, and responsively receiving information associated with the action of the component from a sensor. The method further includes a computing system having a processor and a memory comparing the information with calibration data and determining a status of the component based on the comparison. In some examples, the calibration data may include information derived from data received from a pool of one or more devices utilizing same or similar components as the component. The determined status may include information associated with a performance of the component with respect to performances of same or similar components of the pool of devices. In one example, the device may self-calibrate the component based on the status.

20 Claims, 8 Drawing Sheets

(56) References Cited

U.S. PATENT DOCUMENTS

| | | | | |
|---|---|---|---|---|
| 8,321,364 B1 * | 11/2012 | Gharpure | ............... | G06Q 30/02 706/45 |
| 8,374,421 B1 * | 2/2013 | Hickman | ............... | B25J 9/1697 318/568.12 |
| 8,380,349 B1 * | 2/2013 | Hickman | ............... | G05D 1/0246 700/247 |
| 8,380,652 B1 * | 2/2013 | Francis, Jr. | ............ | B25J 9/1661 706/48 |
| 8,386,078 B1 * | 2/2013 | Hickman | .......... | G06F 17/30194 318/568.1 |
| 8,386,079 B1 * | 2/2013 | Kohler | ............... | G06K 9/00362 700/246 |
| 8,406,926 B1 * | 3/2013 | Lewis | .................... | G06Q 30/02 382/115 |
| 8,428,777 B1 * | 4/2013 | Poursohi | .......... | G05B 19/41865 700/247 |
| 8,447,863 B1 * | 5/2013 | Francis, Jr. | ....... | G06F 17/30542 707/724 |
| 8,452,451 B1 * | 5/2013 | Francis, Jr. | ............ | B25J 9/1658 700/245 |
| 8,525,853 B1 * | 9/2013 | Hickman | ................ | G06T 19/00 345/420 |
| 8,532,820 B1 * | 9/2013 | Sampath | ................ | G06Q 10/06 700/245 |
| 8,594,845 B1 * | 11/2013 | Gharpure | ................ | G10L 15/22 700/253 |
| 8,639,644 B1 * | 1/2014 | Hickman | ............... | G06N 3/008 700/245 |
| 8,718,822 B1 * | 5/2014 | Hickman | ............... | B25J 9/1674 700/214 |
| 8,918,208 B1 * | 12/2014 | Hickman | ............... | B25J 9/1602 700/1 |
| 8,930,022 B1 * | 1/2015 | Kuffner, Jr. | ............ | B25J 9/1674 180/65.8 |
| 8,947,522 B1 * | 2/2015 | Hickman | ................ | H04N 7/18 348/114 |
| 8,965,104 B1 * | 2/2015 | Hickman | ................ | G06T 7/00 382/153 |
| 8,972,055 B1 | 3/2015 | Desai et al. | | |
| 8,996,429 B1 * | 3/2015 | Francis, Jr. | ............ | G06N 3/008 706/12 |
| 9,008,839 B1 * | 4/2015 | Kuffner, Jr. | ............ | B25J 9/0084 700/248 |
| 9,024,771 B1 * | 5/2015 | Kuffner, Jr. | ............ | G08B 21/18 340/679 |
| 9,205,886 B1 * | 12/2015 | Hickman | ............... | B25J 9/1697 |
| 9,327,404 B2 * | 5/2016 | Kuffner, Jr. | ............ | B25J 9/1674 |
| 2008/0256517 A1 | 10/2008 | Atkin et al. | | |
| 2010/0178982 A1 | 7/2010 | Ehrman et al. | | |

OTHER PUBLICATIONS

Park, Juyi et al, Toward Intelligent System Health Monitoring for NASA Robonaut, 4th IEEE/RAS International Conference on Humanoid Robotics, 2004.

* cited by examiner

SYSTEMS AND METHODS FOR DETERMINING A STATUS OF A COMPONENT OF A DEVICE

CROSS-REFERENCE TO RELATED APPLICATIONS

This application claims the benefit of U.S. patent application Ser. No. 14/556,846 filed on Dec. 1, 2014, which is a continuation of U.S. patent application Ser. No. 13/757,808 filed on Feb. 3, 2013, which claims the benefit of U.S. Provisional Application No. 61/595,865 filed on Feb. 7, 2012, the entirety of each of which are herein incorporated by reference.

FIELD

This disclosure relates to robot cloud computing, and in examples, to determining a status of a component of a robotic device in a robot-cloud interaction.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a client device may be a computing device with sensors, actuators, and other components. For example, the client device may be a robotic device including sensors, such as a gyroscope, optical sensor, biosensor, wireless sensor, etc., and actuators, such as motors, wheels, moveable arms, etc.

SUMMARY

This disclosure may disclose, inter alia, systems and methods for determining a status of a component of a robotic device in a robot-cloud interaction.

In one example, a method is provided that comprises triggering an action of a component of a robotic device, and responsively receiving information associated with the action of the component of the robotic device from a sensor. The method may further include a computing system having a processor and a memory comparing the information with calibration data. The calibration data may comprise information derived from data received from a pool of one or more robotic devices utilizing same or similar components. According to the method, the computing system may also determine a status of the component based on the comparison. In some examples, the status may comprise information associated with a performance of the component.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a computer-readable memory having stored thereon instructions executable by a computing device to cause the computing device to perform functions is provided. The functions may comprise triggering an action of a component of a robotic device, and responsively receiving information associated with the component of the robotic device from a sensor. The functions may further include comparing the information with calibration data. The calibration data may comprise information derived from data received from a pool of one or more robotic devices utilizing same or similar components. The functions may also include determining a status of the component based on the comparison. In some examples, the status may comprise information associated with a performance of the component.

The computer readable memory may include a non-transitory computer readable medium, for example, such as computer-readable media that stores data for short periods of time like register memory, processor cache and Random Access Memory (RAM). The computer readable memory may also include non-transitory media, such as secondary or persistent long term storage, like read only memory (ROM), optical or magnetic disks, compact-disc read only memory (CD-ROM), for example. The computer readable memory may also be any other volatile or non-volatile storage systems. The computer readable memory may be considered a computer readable storage medium, for example, or a tangible storage medium.

In addition, circuitry may be provided that is configured to perform logical functions in any processes or methods described herein.

In still further examples, any type of devices may be used or configured to perform logical functions in any processes or methods described herein.

In another example, a system is provided that comprises a robotic device and a computing component. The robotic device may be configured to receive, via a network, information associated with instructions for performing an action of a component of the robotic device. The robotic device may be further configured to transmit, via the network, information associated with the component that is received from a sensor. The computing component may comprise a processor and a memory coupled to the processor, and may be capable of communicating with a pool of robotic devices over the network. The computing component may be configured to trigger the action of the component of the robotic device, and responsively receive information associated with the component of the robotic device from the sensor. The computing component may also be configured to compare the information with calibration data. The calibration data may include information derived from data received from the pool of robotic devices, and the pool of robotic devices may utilize same or similar components. The computing component may be further configured to determine a status of the component based on the comparison. In some examples, the status may comprise information associated with a performance of the component.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for determining a status of a component of a robotic device in a robot-cloud interaction. An example method includes triggering an action of a component of a robotic device over time. For example, the action may be a predetermined movement, action, or other function that activates one or more components of the robotic device. In some examples, the components may include sensors (e.g., a gyroscope, optical sensor, biosensor, wireless sensor, etc.) and/or actuators (e.g., motors, wheels, moveable arms, etc.) of the robotic device. However, the method may be applicable to any component of the robotic device.

In response to the action of the component, information associated with the component of the robotic device may be responsively received from a sensor of the robotic device. For example, in an instance in which the component is an actuator, the sensor may be associated with an actuator of the robotic device and receive information in response to movement of the actuator.

According to the method, the information may be compared with calibration data that may include information derived from data received from a pool of robotic devices. The pool of robotic devices may include robotic devices utilizing same or similar components as the component of the robotic device. As an example, the data may include historical operational data or real-time operational data collected from a population of robotic devices. Information may be derived from the data collected from the population of robotic devices to form the calibration data. In one instance, a computing system having a processor and a memory may compare the received information associated with the component of the robotic device with the calibration data. For example, the calibration data may include nominal data such as averages for various characteristics of the component, and the nominal data may be compared with the received information associated with the component.

In addition, a status of the component may be determined by the computing system based on the comparison. For example, the comparison may indicate a miscalibrated or malfunctioning component, and the status may include information identifying the miscalibration or malfunction of the component.

In one example, the method may be performed by the robotic device, and the robotic device may further self-calibrate or auto-tune the component based on the status. For example, the robotic device may receive the calibration data from a server in a cloud in order to perform the comparison. The cloud may also be connected to multiple robotic devices utilizing same or similar components as the component of the robotic device.

In other examples, the method may be performed by the server in the cloud. In one instance, the server may receive the information associated with the component, and may notify the robotic device, or an operator of the robotic device, of the status of the component based on the comparison.

Additionally, in one instance, the method may be performed in an on-going basis so as to calibrate or identify a status of the component in light of changing conditions. Thus, the method may provide for an automated monitoring of components of robotic devices by way of a robot-cloud interaction.

Figure 1:
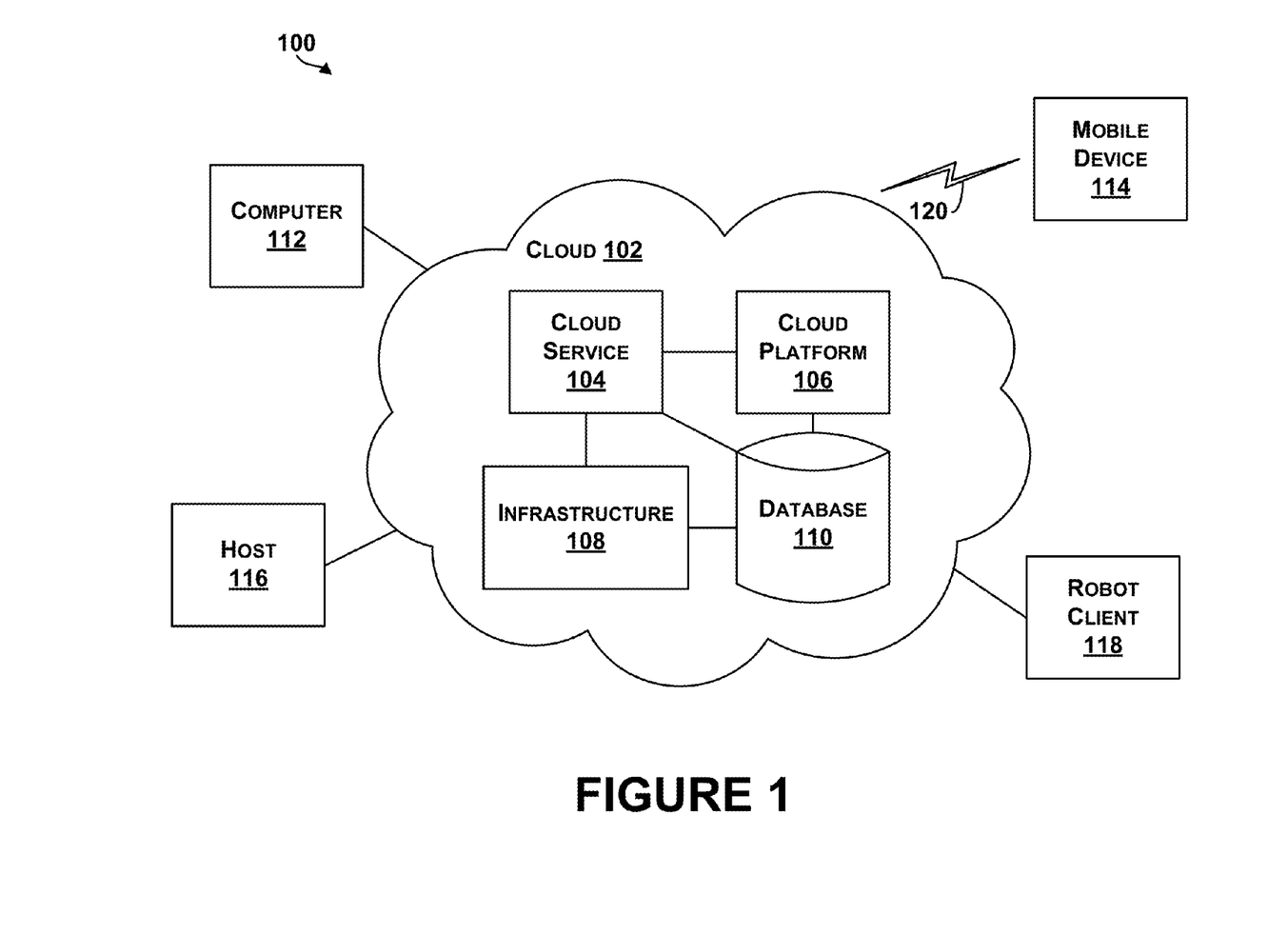
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the cloud infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, encoders, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
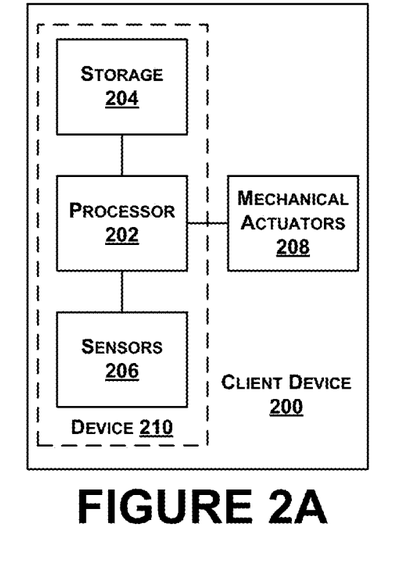
FIGS. 2A-2C are example illustrations of robotic devices.
Figure 2B:
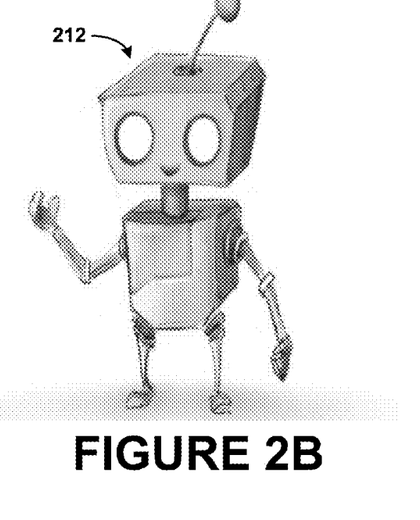
Figure 2C:
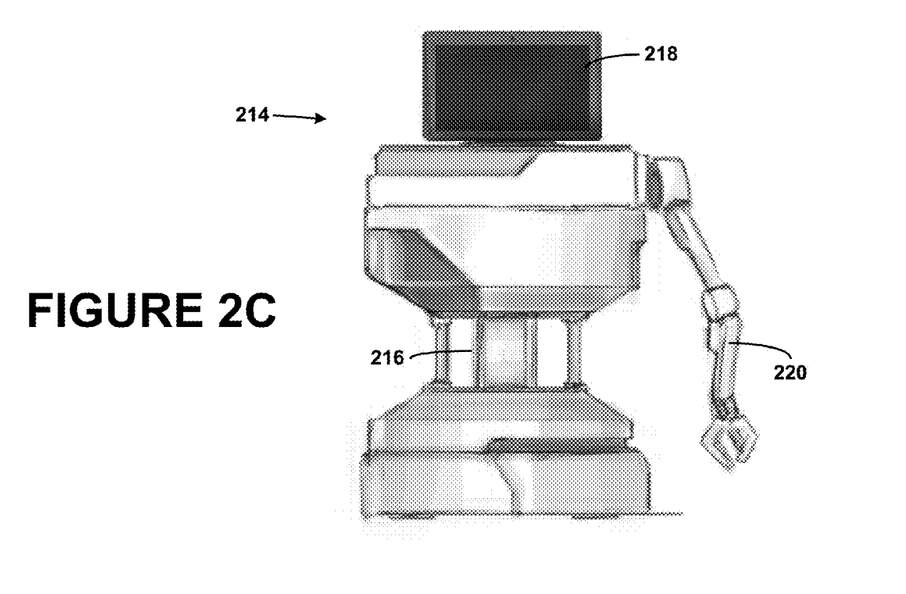

FIGS. 2A-2C are example illustrations of robotic devices. Any of the robots illustrated in FIGS. 2A-2C may be configured to operate according to example methods described herein, or according to instructions received from devices that may be configured to operate according to example methods described herein.

An example illustration of a robotic device 200 is shown in FIG. 2A. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, encoders, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); as well as proprietary software, and other examples also include ROSJAVA. A robot operating system may include publish and subscribe functionality, and may also include functionality to control components of the robot, such as head tracking, base movement (e.g., velocity control, navigation framework), etc.

Figure 3:
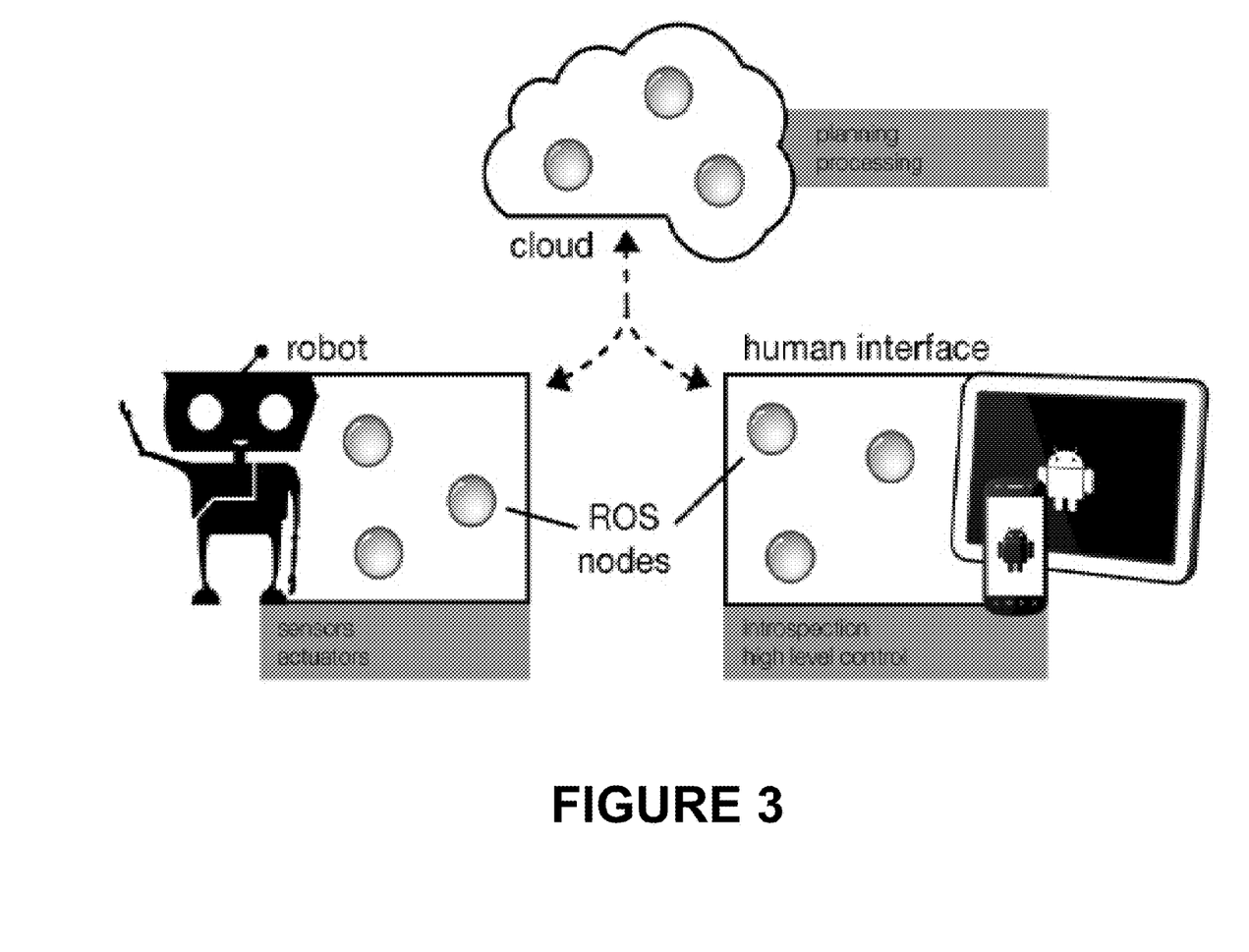
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
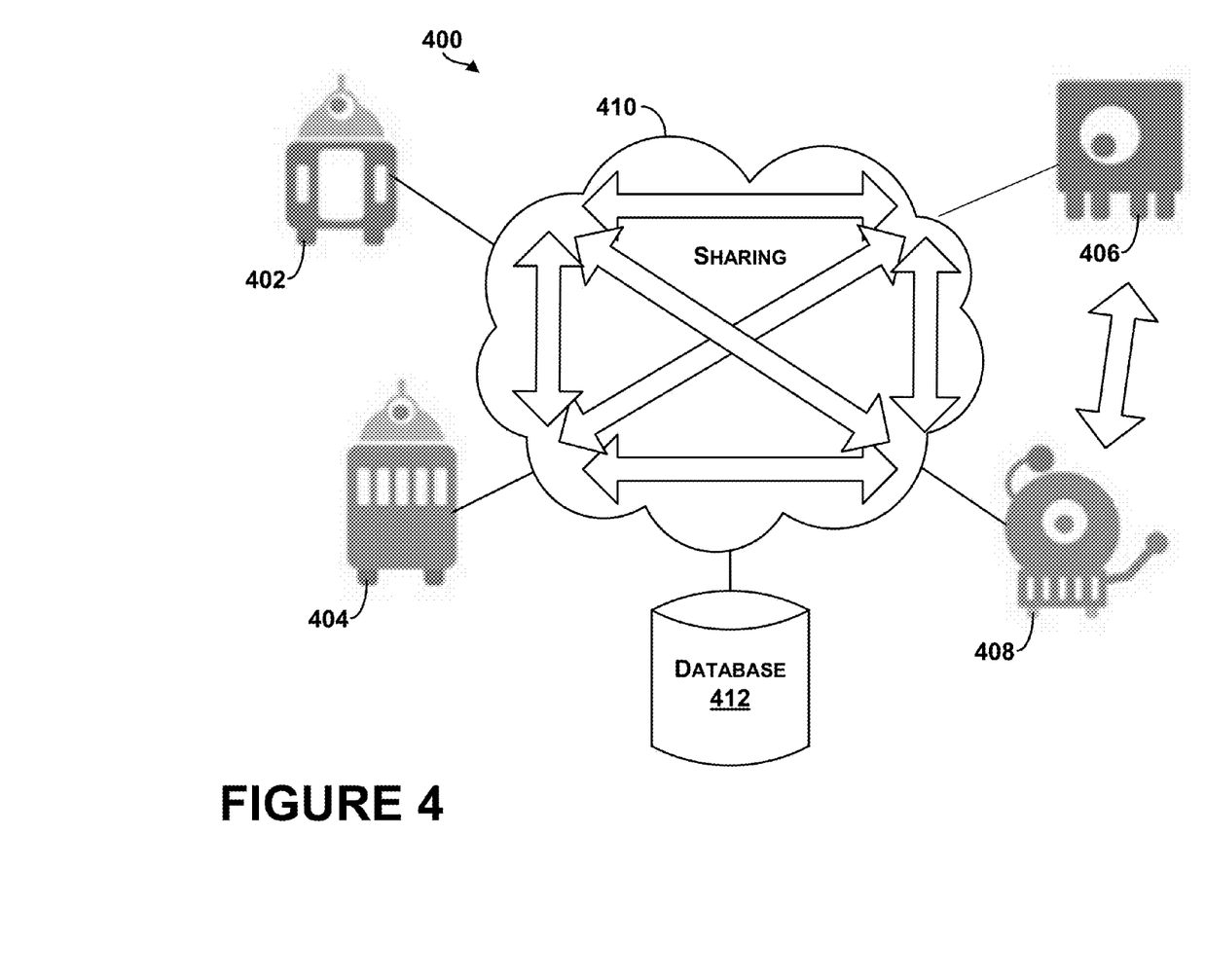
FIG. 4 is an example system in which robotic devices may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program in the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Each robot 402, 404, 406, and 408 will have access to real-time, up-to-date data. Overall, the robots 402, 404, 406, and 408 may be configured to share data that is collected to enable faster adaptation, such that each robot 402, 404, 406, and 408 can build upon a learned experience of a previous robot.

The database 412 may be accessible by all robots through the cloud 410 (or alternatively directly accessible by all robots without communication through the cloud 410). The database 412 may thus be a shared knowledge base stored in the cloud 410. In some examples, robots may share learned behaviors through the cloud 410. The cloud 410 may have a server that stores robot-learned activities or behaviors resulting in a shared knowledge base of behaviors and heuristics for object interactions (e.g., a robot "app store").

Thus, within examples, the robots 402, 404, 406, and 408 may share information through the cloud 410, and may access the database 412. The robots 402, 404, 406, and 408 may access the cloud 410 to perform any number of functions or methods described herein.

In one example, a robot may interact with the cloud to determine the status of a component. For example, the cloud may receive information from multiple robots including logs of statuses and user interactions. In some examples, automated processes within the cloud or the robot may be used to determine the status of the component.

Figure 5:
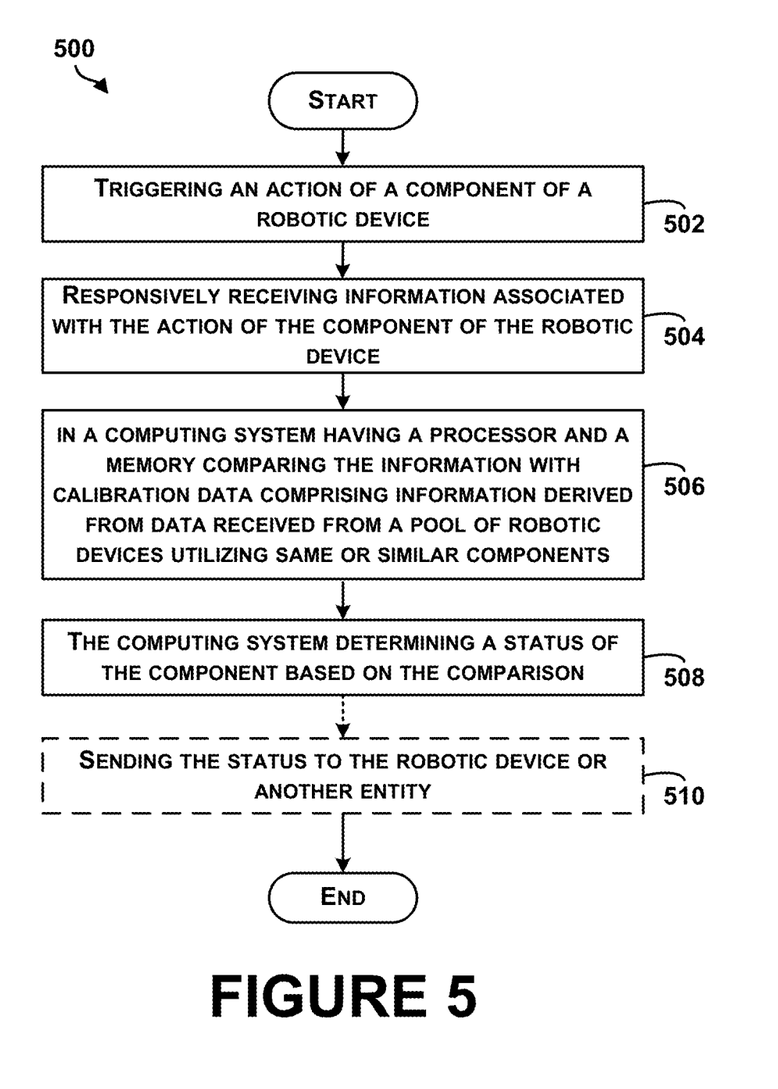
FIG. 5 is a block diagram of an example method of determining a status of a component of a robotic device.

FIG. 5 is a block diagram of an example method 500 of determining a status of a component of a robotic device. Method 500 shown in FIG. 5 presents an embodiment of a method that could be used with the system 100, for example, and may be performed by a device, such as any devices illustrated in FIGS. 1-2, or components of the devices. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems.

The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes triggering an action of a component of a robotic device. In one example, the component may be a sensor receiving information from an environment in which the robotic device resides. In another example, the component may be a sensor on a robotic device monitoring performance of the robotic device or the environment. In yet another example, the component may be an actuator of the robotic device.

In one instance, the triggering of the action may occur over time in order to identify a performance of the component over time. For example, the action of the component may be prompted at predetermined intervals. In other examples, the action of the component may be triggered by a server monitoring a status of the component over time. In one example, the triggering of the action may occur upon initialization of the robotic device. The robotic device may perform the action when the robotic device is powered on, for example.

At block 504, the method 500 includes responsively receiving information associated with the action of the component of the robotic device. In some examples, the information associated with the component of the robotic device may be received from a sensor of the robotic device. In other examples, the information associated with the component may be received from a sensor that is not a part of the robotic device. The information associated with the component may include a temperature, amount of light, amount of power draw (e.g., amount of current or amount of wattage), battery life, audio information (e.g., a decibel level or audio clip), visual information (such as images/videos etc.), among other possibilities.

In one instance, the robotic device may transmit information associated with the component at one time, or any combination of times, such as a time prior to the action of the component, a time during the action of the component, or a time subsequent to the action of the component. In another instance, the robotic device may continuously transmit the information associated with the component, while a database may record information associated with the component at instances in time surrounding or during the action of the component.

At block 506, the method 500 includes a computing system having a processor and a memory comparing the information with calibration data comprising information derived from data received from a pool of robotic devices utilizing same or similar components. The pool may include one or more than one robotic devices. The computing system may have access to the calibration data. In some examples, the calibration data may be derived from data received from other robotic devices utilizing the same or a similar component as the component of the robotic device. For example, the computing system may be a computing module of the robotic device, another given robotic device of the pool of robotic devices, or a server separate from the robotic devices (e.g., a server in a cloud with which the pool of robotic devices is connected via a network) that has access to a database comprising the calibration data.

In one example, the calibration data may comprise information received from the robotic device in response to a previous action of the component and/or historical information received from other robotic devices of the pool of robotic devices. The comparison may involve performing a regression test to identify regressions or changes in a performance of the component due to a passage of time or changing conditions of an environment in which the robotic device resides, operates, or is configured to operate (e.g., changes in lighting, temperature, floor surface, etc.). For example, the action of the component may include capturing an image of a predetermined object using a camera of the robotic device. The image may be compared with other images of the object previously captured to identify regressions or errors between the images.

In another example, the calibration data may include real-time data from the pool of robotic devices, and the calibration data may be modified continuously based on the real-time data. Thus, the calibration data may be adjusted to account for changing conditions experienced by the pool of robotic devices.

In yet another example, the pool of robotic devices may include a fleet of similar robotic devices operating in an area with similar functions. The calibration data may include information received from the pool of robotic devices. In some examples, the comparison may include a statistical analysis of the information received from the similar robotic devices to determine whether a performance component is within an acceptable limit of performances of the same or similar components of the similar robotic devices.

At block 508, the method 500 includes determining a status of the component based on the comparison. In some examples, the status may include information associated with a performance of the component of the robotic device. For example, the status of the component may be determined relative to performances of same or similar components utilized by the pool of robotic devices.

Optionally, at block 510, the status may be sent to the robotic device or another entity. In another example, the status may be a flag indicating the component (or the robotic device) is prone to more errors. In one instance, based on the flag, an alert indicating the status may be generated and provided to another entity (e.g., another robotic device, an operator of the pool of robotic devices, a technician, etc.) based on the flag.

In an example in which an image received from an optical sensor of the robotic device includes regressions with respect to previous images within the calibration data, the status of the component may indicate that the optical sensor needs to be adjusted. For example, an object in the image may have shifted or be out of focus, and the status may indicate the optical sensor needs to be adjusted accordingly.

In some examples, the method 500 may be performed by the robotic device. For example, the robotic device may query a server for the calibration data, and receive from the server the calibration data. The calibration data may include nominal values or averages associated with components of the pool of robotic devices. A computing system of the robotic device may compare the information associated with the component with the calibration data, and determine a status of the component. In one instance, identities of other robotic devices of the pool of robotic devices may be secured in the server and not included within the calibration data sent to the robotic device. For example, the calibration data may indicate the pool of robotic devices includes anonymous robotic devices. Thus, the calibration data may, in some examples, be anonymous data.

In other examples, the method 500 may be performed by a server (e.g., a server in a cloud). The information received from the robotic device may be stored in a database. The database may include historical and/or real-time data from other robotic devices of the pool of robotic devices. A computing system of the server in the cloud may receive the information associated with the component of the robotic device, compare the information with the calibration data, and determine the status of the component. In one example, information associating an identity of the robotic device and the information associated with the component of the robotic device may be secured within the server. Thus, in some examples, information associated with the identity of the robotic device may be private, and not be distributed to other robotic devices.

Figure 6:
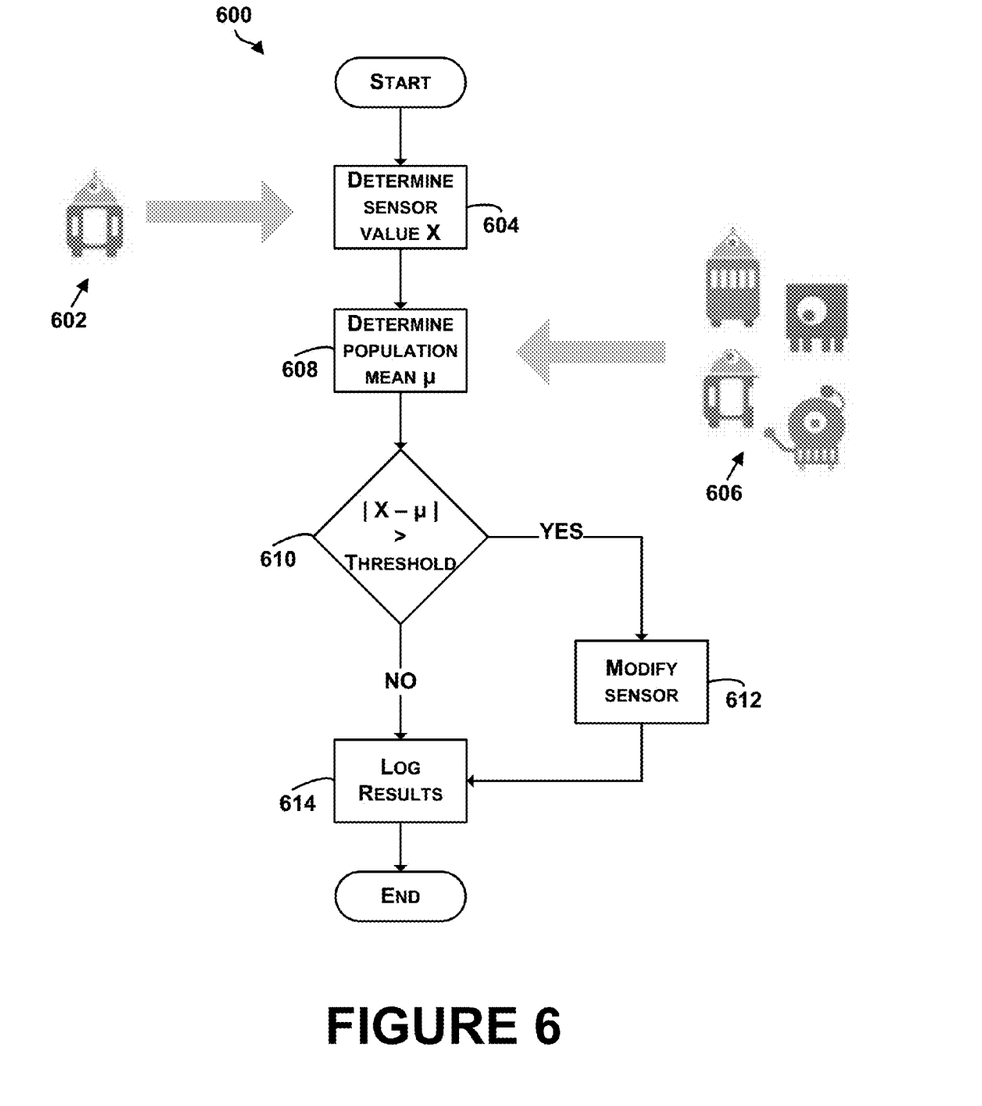
FIG. 6 is a flow diagram illustrating an example method of calibrating a component of a robotic device.

FIG. 6 is a flow diagram 600 illustrating an example method of calibrating a component of a robotic device 602. In some examples, the robotic device 602 may calibrate the component based on the status of the component.

For example, the robotic device 602 may determine a sensor value for a sensor at block 604. In one instance, the sensor may be a device capable of determining a temperature. As an example, the robotic device 602 may determine a temperature value of seventy-six degrees.

Additionally, sensor values for same or similar components of a pool of one or more robotic devices 606 may be determined at block 608. In one example, a population mean (e.g., seventy-eight degrees) may be determined based on sensor values from other sensors of the pool of robotic devices. However, in other examples, other statistical measures (e.g., median, mode, etc.) may be used for determining a nominal value for the sensor. In some instances, the information from the pool of robotic devices 606 may be real-time data. In other instances, the information from the pool of robotic devices 606 may be historical data stored in a database.

In one example, the pool of robotic devices 606 may be in a location that is the same location or near to a location of the robotic device 602. Thus, the information from sensor values of the pool of robotic devices 606, and the population mean, may be similar to data which may be expected to be received from the robotic device 602.

At decision block 610, the population mean for the pool of robotic devices 606 may be compared to the sensor value of the robotic device 602. In one instance, an absolute value of a difference between the sensor value and the population mean may be compared to a threshold (e.g., a threshold of 1 degree). In other instances, the comparison may be based on other calculations. Similarly, the threshold may be varied based on historical information or real-time data associated with the pool of robotic devices 606 or as configured by a user or technician.

Based on the decision at block 610, when the absolute value of the difference is greater than the threshold, the sensor of the robotic device 602 may be modified at block 612. For example, an offset of the sensor may be calibrated or modified such that the sensor value is substantially consistent with the population mean of the pool of robotic devices 606. In some examples, the modification of the offset may be performed by the robotic device 602. In other examples, the modification of the offset may be performed in a device that the robotic device 602 is configured to communicate with via cloud computing. In one instance, the value of the offset may be the difference between the sensor value and the population mean. In another instance, the offset may be a curve to account for sensors that may be miscalibrated at extremes (e.g., very high or very low temperatures). In some examples, the sensor value and an amount of offset applied to the sensor may be stored in a database at block 614.

Based on the decision at block 610, when the absolute value of the difference is less than the threshold, no modification to the sensor value may be made, and the sensor value may be stored in the database at block 614.

In an alternative embodiment (not shown), if it is determined that the sensor value is outside of a second threshold, a communication to a host may be triggered. The communication may indicate that a part replacement or a repair call is warranted, for example.

In some examples, rather than requesting a replacement sensor, the robotic device 602 may self-calibrate based on information from the pool of robotic devices 606. Additionally, the ability of the robotic device 602 to self-calibrate may reduce an amount of manual tuning and/or diagnostics required by a technician. The method 600 may also be applicable to other components, such as motors, actuators, vision systems, positioning systems, or other components of the robotic device 602. Thus, the example is not meant to be limited to sensors.

Figure 7:
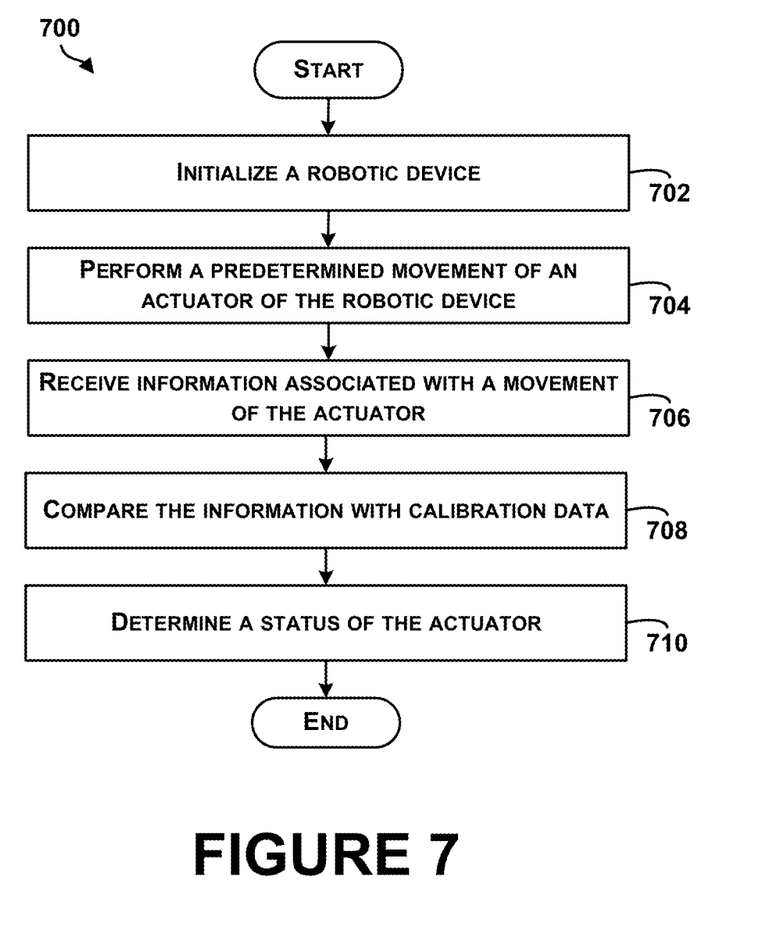
FIG. 7 is another block diagram of an example method of determining a status of a component of a robotic device.

FIGS. 7 is another block diagram of an example method of determining a status of a component of a robotic device. The method 700 shown in FIG. 7 presents an embodiment of a method that may, for example, be used by the system 100 of FIG. 1, and may be performed by a device, such as any devices illustrated in FIGS. 1-2, or components of the devices Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 7 may represent circuitry that is wired to perform the specific logical functions in the process.

Initially, at block 702, the method 700 includes initialize a robotic device. In some examples, initialization may refer to a time when the robotic device is activated, a time when the robotic device is powered on after having been powered down, or a time when the robotic device has been initialized after maintenance has been performed on the robotic device. However, the method 700 may also be applicable to other times and the example is not meant to be limiting.

At block 704, the method 700 includes perform a predetermined movement of an actuator of the robotic device. In one instance, the robotic device may make a few moves (e.g., move forward, right, backward, etc.) according to a predetermined schedule. In another instance, the movement may involve exercising a movable arm associated with the robotic device.

At block 706, the method 700 includes receive information associated with a movement of the actuator. For example, a sensor associated with the actuator may receive information during and/or around a time when then movement of the actuator occurs.

At block 708, the method 700 includes compare the information with calibration data. In one example, the information may be compared with a set of calibration data on a server to identify if the robotic device has any problems (e.g., miscalibrations or malfunctions). The data on the server may include historical operational data collected from a population of robotic devices such that the server may determine baseline operational data. The baseline operational data may correspond to an expected average range of performance based on data collected from multiple robotic devices. In one instance, if the robotic device moves to the right but does not traverse a certain distance over a certain time period, a problem may be identified with a wheel.

At block 710, the method 700 includes determine a status of the actuator. For example, a server may identify any problems or notify a user of a malfunctioning robotic device. The status may be associated with performance of the component. In some examples, a display of the status may be provided.

Figure 8:
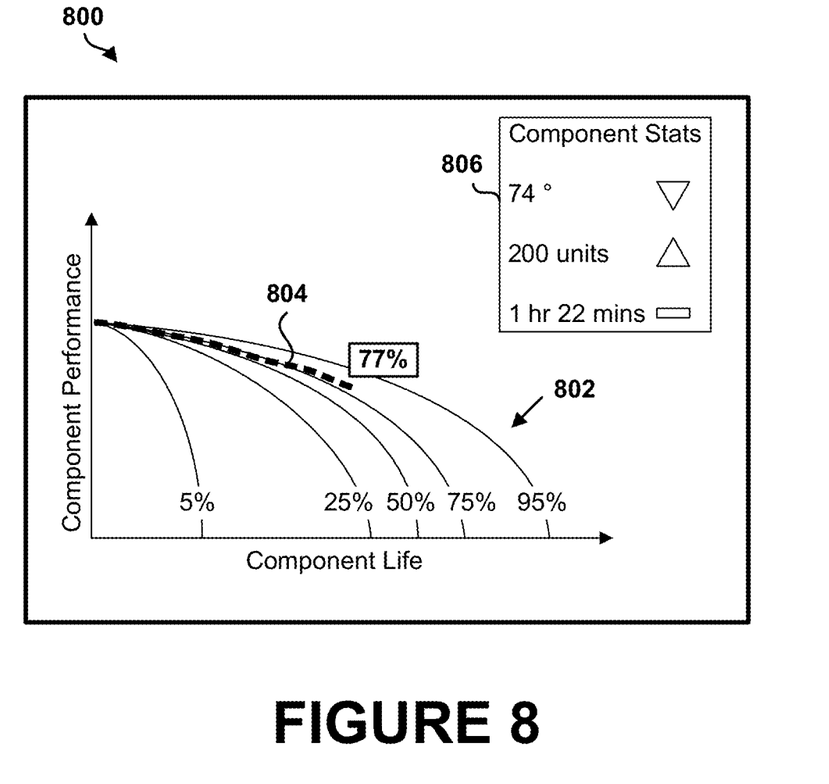
FIG. 8 is an example conceptual illustration of a display of a status of a component of a robotic device.

FIG. 8 is an example conceptual illustration of a display 800 of a status of a component of a robotic device. In one example, the display 800 may include information associated with a pool of robotic devices. For example, as shown in the display 800, one or more percentile curves 802 may indicate typical performance of a component versus a life of the component as determined from calibration data. Additionally, the performance of the robotic device may be shown by an individual curve 804 relative to performances of components of the pool of robotic devices.

In one example, the display 800 may also include component statistics 806. The statistics 806 may be associated with performance of the component of the robotic device. Optionally, the statistics may also include a graphical indicator illustrating a relationship of the component to an average value (e.g., an upward-pointing triangle may indicate the statistic is greater than the average value, a downward-pointing triangle may indicate the statistic is less than the average value, etc.). The average value may be determined based on real-time data from the pool of robotic devices and/or historical data associated with the pool of robotic devices.

In some examples, the display 800 may be accessed via a web interface connected to a server in a cloud. In other examples, the display 800 may be provided on a display associated with the robotic device and configured to receive information from the server in the cloud. In one instance, the display 800 may further include information indicating on-screen alerts based on the status of the component as determined by the server in the cloud (not shown).

Although the systems and methods have been described with respect to a given component of a robotic device, in some examples, the systems and methods may provide information associated with a general health for a plurality of robotic devices (e.g., individual health information for each of a fleet of network connected robotic devices). In one instance, a server may combine information associated with a performance of a plurality of components of a given robotic device with respect to performance of the plurality of components by the fleet of robotic devices to determine a general health of the given robotic device.

Additionally, although the systems and methods have been described with respect to robotic devices, the systems and methods may also be applicable to monitoring of any cloud connected devices (e.g., cars, phones, tablets, etc.). Given a fleet of similar devices publishing information associated with components of the devices to a cloud, a central computing system in the cloud may be capable of monitoring status and health of the components or the devices based on historical logs of data associated with the components/devices and/or real-time data received from the devices.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   initializing, by one or more computing devices, a robotic device;
   providing, by the one or more computing devices, instructions to cause an actuator of the robotic device to perform a predetermined movement upon initialization of the robotic device;
   responsively receiving, by the one or more computing devices, information associated with the predetermined movement of the actuator of the robotic device;
   comparing, by the one or more computing devices, the received information with calibration data comprising information derived from data received from a pool of one or more robotic devices utilizing same or similar actuators, wherein the data received from the pool comprises information associated with respective movements of respective actuators of the one or more robotic devices of the pool; and
   determining, by the one or more computing devices, a status of the actuator of the robotic device based on the comparison, wherein the status comprises information associated with a performance of the actuator.

2. The method of claim 1, wherein the calibration data further comprises information responsively received and associated with the actuator of the robotic device in response to a previous movement of the actuator, and wherein comparing the information comprises performing a regression test.

3. The method of claim 1, wherein the method is performed by the robotic device, and the method further comprises:
   querying a server for the calibration data; and
   receiving from the server the calibration data.

4. The method of claim 1, wherein the pool of robotic devices includes anonymous robotic devices.

5. The method of claim 4, wherein the information derived from data received from the pool of robotic devices utilizing same or similar actuators comprises real-time data from the pool of robotic devices, and the method further comprises:
   modifying the calibration data based on the real-time data from the pool of robotic devices.

6. The method of claim 1, wherein the method is performed by a server.

7. The method of claim 6, further comprising:
   storing the information associated with the actuator of the robotic device in a database in the server, wherein information associating an identity of the robotic device and the information associated with the actuator is secured within the server.

8. The method of claim 1, further comprising:
the robotic device calibrating the actuator based on the status of the actuator.

9. The method of claim 8, wherein calibrating the actuator comprises modifying an offset of the actuator such that the information associated with the actuator is substantially consistent with a population mean, wherein the population mean is derived from the data received from the pool of robotic devices.

10. The method of claim 8, wherein the method is performed on a continuous basis so as to calibrate the actuator based on changing conditions in an environment in which the robotic device resides.

11. The method of claim 1, further comprising:
providing a display of the status of the actuator, wherein the display comprises information associated with the pool of robotic devices.

12. The method of claim 11, wherein the display comprises information associated with a percentile of the status of the actuator with respect to the information derived from the data received from the pool of robotic devices.

13. The method of claim 1, further comprising:
generating an alert configured to be provided to other entities based on the status, wherein the alert comprises the status.

14. A non-transitory computer readable memory having stored therein instructions executable by one or more computing devices to cause the one or more computing devices to perform functions comprising:
initializing a robotic device;
providing instructions to cause an actuator of the robotic device to perform a predetermined movement upon initialization of the robotic device;
responsively receiving information associated with the predetermined movement of the actuator of the robotic device;
comparing the received information with calibration data comprising information derived from data received from a pool of one or more robotic devices utilizing same or similar actuators, wherein the data received from the pool comprises information associated with respective movements of respective actuators of the one or more robotic devices of the pool; and
determining a status of the actuator of the robotic device based on the comparison, wherein the status comprises information associated with a performance of the actuator.

15. The non-transitory computer readable memory of claim 14, wherein the information derived from data received from the pool of robotic devices utilizing same or similar actuators comprises real-time data from the pool of robotic devices, and further comprising instructions executable by the computing device to perform functions comprising:
modifying the calibration data based on the real-time data from the pool of robotic devices.

16. The non-transitory computer readable memory of claim 14, further comprising instructions executable by the computing device to perform functions comprising:
generating an alert configured to be provided to other entities based on the status, wherein the alert comprises the status.

17. The non-transitory computer readable memory of claim 14, wherein the calibration data further comprises information responsively received and associated with the actuator of the robotic device in response to a previous movement of the actuator, and wherein comparing the information comprises performing a regression test.

18. A system comprising:
a robotic device, configured to:
receive via a network information associated with instructions for performing a movement of an actuator of the robotic device; and
in response to performing the movement, transmit via the network information associated with the movement of the actuator received from a sensor; and
a computing component comprising a processor and a memory coupled to the processor and capable of communicating with a pool of one or more robotic devices over the network, the computing component configured to:
provide instructions to cause an actuator of the robotic device to perform a predetermined movement upon initialization of the robotic device;
responsively receive information associated with the predetermined movement of the actuator of the robotic device from the sensor;
compare the received information with calibration data comprising information derived from data received from a pool of one or more robotic devices utilizing same or similar actuators, wherein the data received from the pool comprises information associated with respective movements of respective actuators of the one or more robotic devices of the pool; and
determine a status of the actuator of the robotic device based on the comparison, wherein the status comprises information associated with a performance of the actuator.

19. The system of claim 18, wherein the computing component is further configured to:
provide a display of the status of the actuator, wherein the display comprises information associated with the pool of robotic devices.

20. The system of claim 18, wherein the display comprises information associated with a percentile of the status of the actuator with respect to the information derived from the data received from the pool of robotic devices.

* * * * *